Dec. 2, 1952        E. BUTTERWORTH        2,619,838

DRY GAS METER WITH DRAINAGE MEANS

Filed July 24, 1950

Inventor

E. Butterworth

By Glascock Downing Reibold
Attys.

Patented Dec. 2, 1952

2,619,838

UNITED STATES PATENT OFFICE 2,619,838

DRY GAS METER WITH DRAINAGE MEANS

Edward Butterworth, Farnworth, near Bolton, England, assignor to Begwaco Meters Limited, Farnworth, near Bolton, England, a British company Application July 24, 1950, Serial No. 175,601
In Great Britain September 5, 1949

2 Claims. (Cl. 73—272)

This invention relates to dry gas meters and is concerned with the elimination from the diaphragm chambers of any liquid deposits which tend to accumulate therein during the functioning of the meter and which by taking up space which should be occupied by gas, cause the meter to give inaccurate readings of gas passed.

In accordance with my present invention, I provide one or more wicks which extend through the base of each diaphragm chamber from the inside to the outside and which serve by capillarity to drain off to the gas meter casing any liquor which may be deposited by the gas in the diaphragm chambers and this without providing any path for the passage of gas by the drainage means. The walls of the diaphragm chambers usually converge to the peripheral edges of the diaphragms where they are clamped between the edges of the two casings of the two diaphragm chambers associated with each diaphragm. The wicks pass through the part of each casing where it is clamped onto the diaphragm along the bottom edge thereof which is where the liquid accumulates.

My improvement is found to be very efficient and it is simple to apply.

Referring to the accompanying explanatory drawings:

Figures 2 and 3 are sectional views on the line A—B of Figure 1 showing the diaphragms of the two diaphragm chambers with wicks at their opposite sides.

Figure 1:
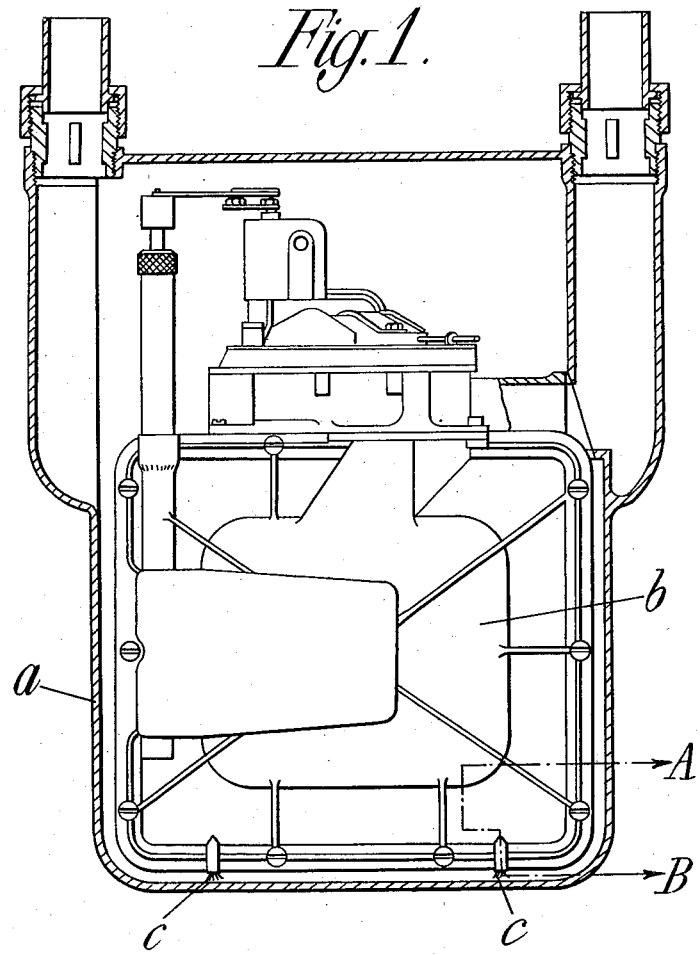
Figure 1 is a sectional view through a gas meter having my invention incorporated therein.
Figure 1:
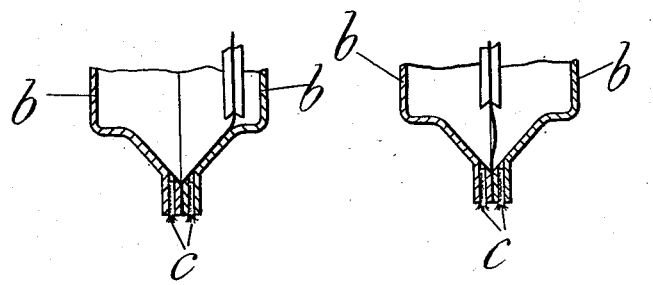

The meter comprises the usual outer case $a$ and diaphragm chambers $b$. There are the usual mechanisms for operating the gas transfer valves and the index mechanism.

In accordance with my present invention, wicks $c$ are provided which extend through the base of each diaphragm chamber at opposite sides of the diaphragm therein and terminate in the casing $a$ beneath the diaphragm chambers. The diaphragm chambers converge towards the diaphragms therein at the base of the chambers so that any liquor accumulates upon the wicks and drains by capillarity into the meter casing.

What I claim is:

1. A dry gas meter, having an outer case, two pairs of diaphragm chambers located in the case, a diaphragm between the diaphragm chambers of each pair, the walls of the diaphragm chambers converging to the peripheral edges of the associated diaphragms when the diaphragms are clamped between the walls, and wicks extending through the base of each diaphragm chamber and terminating in the outer case beneath the diaphragm chambers, to drain away any liquid deposited in the diaphragm chambers.

2. A dry gas meter, having an outer casing, means forming diaphragm chambers therein, such means being formed so as to drain condensates to the bottom of each diaphragm chamber and with passages extending through the base of each chamber, and wicks extending through such passages and terminating in the outer case beneath the chambers, to drain away by capillarity any liquid deposited in the diaphragm chambers without providing any path for the passage of gas.

EDWARD BUTTERWORTH.

REFERENCES CITED

The following references are of record in the file of this patent:

UNITED STATES PATENTS

| Number | Name | Date |
|---|---|---|
| 182,126 | Moon | Sept. 12, 1876 |
| 1,039,942 | Hibberd | Oct. 1, 1912 |
| 2,065,007 | MacLean | Dec. 22, 1936 |
| 2,119,958 | Newill | June 7, 1938 |
| 2,457,851 | Taft | Jan. 4, 1949 |